United States Patent
Sundqvist et al.

(10) Patent No.: US 7,450,601 B2
(45) Date of Patent: Nov. 11, 2008

(54) METHOD AND COMMUNICATION APPARATUS FOR CONTROLLING A JITTER BUFFER

(75) Inventors: Jim Sundqvist, Luleå (SE); Fredrik Jansson, Sundbyberg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 838 days.

(21) Appl. No.: 10/451,338

(22) PCT Filed: Dec. 14, 2001

(86) PCT No.: PCT/SE01/02798

§ 371 (c)(1), (2), (4) Date: Dec. 2, 2003

(87) PCT Pub. No.: WO02/052399

PCT Pub. Date: Jul. 4, 2002

(65) Prior Publication Data

US 2004/0076191 A1     Apr. 22, 2004

(30) Foreign Application Priority Data

Dec. 22, 2000 (SE) .................................. 0004839

(51) Int. Cl.
*H04L 12/28* (2006.01)
*H04J 3/06* (2006.01)

(52) U.S. Cl. ........................ 370/412; 370/516

(58) Field of Classification Search ................ 370/229, 370/230, 230.1, 231, 252, 352, 516, 428, 370/429, 412; 375/371, 372
See application file for complete search history.

(56) References Cited

U.S. PATENT DOCUMENTS 5,157,728 A * 10/1992 Schorman et al. ............ 704/502
5,371,787 A * 12/1994 Hamilton ..................... 379/386
5,450,410 A    9/1995 Hiuchyj et al.

(Continued)

FOREIGN PATENT DOCUMENTS

EP    1 032 165 A1    8/2000

(Continued)

OTHER PUBLICATIONS

Petr et al, "Priority Discarding of Speech in Integrated Packet Networks", IEEE Journal on Selected Areas in Communications, vol. 7, No. 5, Jun. 1989, pp. 644-656.

(Continued)

*Primary Examiner*—Kwang B. Yao
*Assistant Examiner*—Tung Q Tran
(74) *Attorney, Agent, or Firm*—Nixon & Vanderhye, P.C.

(57) ABSTRACT

A method for controlling a jitter buffer and a communication apparatus implementing the method and functioning as a first node of a communication system, wherein the jitter butter is adapted to buffer a stream of blocks of compressed speech information generated in a second node in the communication system, transmitted to and received in the first node. Blocks of compressed speech information in said stream of blocks are selected (201) according to a predetermined rule based on the current buffering delay of the jitter buffer and at least one characteristic of said blocks of compressed speech information. Predetermined actions aiming at reducing buffering delay in the jitter butter are applied (202) to the selected blocks.

4 Claims, 2 Drawing Sheets

U.S. PATENT DOCUMENTS

| | | |
|---|---|---|
| 5,544,324 A | 8/1996 | Edem et al. |
| 5,553,071 A | 9/1996 | Aranguren et al. |
| 5,566,169 A | 10/1996 | Rangan et al. |
| 5,594,732 A | 1/1997 | Bell et al. |
| 5,594,734 A | 1/1997 | Worsley et al. |
| 5,606,562 A | 2/1997 | Landguth |
| 5,617,418 A | 4/1997 | Shirani et al. |
| 5,659,541 A | 8/1997 | Chan |
| 5,668,811 A | 9/1997 | Worsley et al. |
| 5,687,174 A | 11/1997 | Edem et al. |
| 5,699,481 A | 12/1997 | Shlomot et al. |
| 5,805,597 A | 9/1998 | Edem et al. |
| 5,862,343 A | 1/1999 | Landguth et al. |
| 5,999,525 A | 12/1999 | Krishnaswamy et al. |
| 6,064,673 A | 5/2000 | Anderson |
| 6,163,535 A | 12/2000 | Jordan et al. |
| 6,215,797 B1 | 4/2001 | Fellman et al. |
| 6,246,702 B1 | 6/2001 | Fellman et al. |
| 6,335,927 B1 | 1/2002 | Elliott et al. |
| 6,360,271 B1 | 3/2002 | Schuster et al. |
| 6,434,606 B1 | 8/2002 | Boella et al. |
| 6,438,702 B1 | 8/2002 | Hodge |
| 6,452,950 B1 * | 9/2002 | Ohlsson et al. ............. 370/516 |
| 6,556,820 B1 * | 4/2003 | Le et al. .................... 455/411 |
| 6,577,872 B1 | 6/2003 | Lundh et al. |
| 6,590,876 B1 * | 7/2003 | Brent ......................... 370/329 |
| 6,658,027 B1 * | 12/2003 | Kramer et al. ............. 370/516 |
| 6,661,810 B1 | 12/2003 | Skelly et al. |
| 6,683,889 B1 * | 1/2004 | Shaffer et al. .............. 370/516 |
| 6,684,273 B2 | 1/2004 | Boulandet et al. |
| 6,747,999 B1 | 6/2004 | Grosberg et al. |
| 6,862,298 B1 * | 3/2005 | Smith et al. ................ 370/516 |
| 6,983,161 B2 | 1/2006 | Wesby et al. |
| 7,130,368 B1 | 10/2006 | Aweya et al. |
| 2002/0007429 A1 | 1/2002 | Boulandet et al. |
| 2002/0026568 A1 | 2/2002 | Jeon |
| 2002/0075857 A1 | 6/2002 | LeBlanc |
| 2002/0101885 A1 | 8/2002 | Progrebinsky et al. |
| 2002/0120749 A1 | 8/2002 | Widegren et al. |
| 2002/0141452 A1 | 10/2002 | Mauritz et al. |
| 2002/0167911 A1 | 11/2002 | Hickey |
| 2002/0181438 A1 | 12/2002 | McGibney |
| 2003/0031210 A1 | 2/2003 | Harris |
| 2003/0112758 A1 | 6/2003 | Pang et al. |
| 2003/0152093 A1 | 8/2003 | Gupta et al. |
| 2003/0152094 A1 | 8/2003 | Colavito et al. |
| 2003/0169755 A1 | 9/2003 | Ternovsky |
| 2003/0185222 A1 | 10/2003 | Goldstein |
| 2003/0202528 A1 | 10/2003 | Eckberg |
| 2004/0022262 A1 | 2/2004 | Vinnakota et al. |
| 2004/0037320 A1 | 2/2004 | Dickson |
| 2004/0057445 A1 | 3/2004 | LeBlanc |
| 2004/0062252 A1 | 4/2004 | Dowdal et al. |
| 2004/0062260 A1 | 4/2004 | Raetz et al. |
| 2004/0073692 A1 | 4/2004 | Gentle et al. |
| 2004/0076190 A1 | 4/2004 | Goel et al. |
| 2004/0120309 A1 | 6/2004 | Kurittu et al. |
| 2004/0156622 A1 | 8/2004 | Kent, Jr. et al. |
| 2004/0258099 A1 | 12/2004 | Scott et al. |
| 2005/0007952 A1 * | 1/2005 | Scott .......................... 370/229 |
| 2005/0041692 A1 | 2/2005 | Kallstenius |
| 2005/0220240 A1 | 10/2005 | Lesso |
| 2005/0276411 A1 * | 12/2005 | LeBlanc ................ 379/406.05 |
| 2006/0088000 A1 | 4/2006 | Hannu et al. |
| 2007/0150264 A1 * | 6/2007 | Tackin et al. ................ 704/207 |

FOREIGN PATENT DOCUMENTS

| | | |
|---|---|---|
| EP | 12155559 | 6/2002 |
| EP | 1427121 | 6/2004 |
| WO | 00/16509 | 3/2000 |
| WO | 00/42728 | 7/2000 |
| WO | 01/20828 | 3/2001 |
| WO | 01/50657 A2 | 7/2001 |
| WO | 02/13421 A2 | 2/2002 |
| WO | 02/054662 | 7/2002 |

OTHER PUBLICATIONS

Written Opinion and International Search Report mailed Jan. 30, 2006 in corresponding PCT application PCT/SE2005/001556.

International Search Report and Written Opinion mailed Dec. 2, 2004 in corresponding PCT Application PCT/SE2004/001150.

OMA PoC User Plane, OMA-UP-POC=V0_1-20041005-D, Draft Version 1.0.9 Oct. 2004.

David Mills, Internet Time Synchronization: the Network Time Protocol[1,2,3] Electrical Engineering Department University of Delaware, pp. 1-14.

Flavis Cristian, IBM Almaden Research Center, A Probabilistic Approach to Distributed Clock Synchronization, CH2706, 1989 IEEE, pp. 288-296.

Martin De Prycker et al., Terminal Synchronization in Asynchronous Networks, CH2424-0/87/0000-0800, 1987, IFFF, pp. 0800-0807.

William H. Press et al., Numerical Recipes in C: The Art of Scientific Computing, 2nd Edition, Published by the Press Syndicate of the University of Cambridge, 1988, pp. 658-665.

International Search Report mailed Mar. 25, 2002 in corresponding PCT application PCT/SE01/02798.

International Preliminary Examination Report mailed Jan. 10, 2003 in corresponding PCT application PCT/SE01/02798.

* cited by examiner

METHOD AND COMMUNICATION APPARATUS FOR CONTROLLING A JITTER BUFFER

This application is the U.S. National phase of international application PCT/SEO1/02798 filed 14 Dec. 2001 which designates the U.S.

TECHNICAL FIELD OF THE INVENTION

The invention relates to a method for controlling a jitter buffer in a node of a communication system and a communication apparatus implementing said method in a communication system

DESCRIPTION OF RELATED ART

Currently, there is a strong trend in the telecommunication business to merge data and voice traffic into one network using packet switched transmission technology. This trend, often referred to as "Voice over IP" or "IP-telephony", is now also moving into the world of cellular radio communications.

One problem associated with IP-telephony communication systems, is that individual speech packets in a stream of speech packets generated and transmitted from an originating node to a receiving node in the communication system, experiences stochastic transmission delays, which may even cause speech packets to arrive at the receiving node in a different order than they were transmitted from the originating node. In order to cope with the variable transmission delays, causing so-called jitter in the time of arrival of the speech packets at the receiving node and potentially even resulting in packets arriving in a different order than transmitted, the receiving node is typically provided with a jitter buffer used for sorting the speech packets into the correct sequence and delaying the packets as needed to compensate for transmission delay variations, i.e. the packets are not played back immediately upon arrival.

Another problem that is present in "IP-telephony" as opposed to traditional circuit switched telephony is that the clock that controls sampling frequency, and thereby the rate at which speech packets are produced by the originating node, is not locked to, or synchronized with, the clock controlling the sample playout rate at the receiving node. In an "IP-telephony" call involving two personal computers (PC), it is typically the sound board clocks of the PCs that control the respective sampling rates which is known to cause problems. As a result of the difference in clock rates at the originating node and the receiving node, so called clock skew, the receiving node may experience either buffer overflow or buffer underflow in the jitter buffer. If the clock at the originating node is faster than the clock at the receiving node, the delay in the jitter buffer will increase and eventually cause buffer overflow, while if the clock at the originating node is slower than the clock at the receiving node, the receiving node will eventually experience buffer underflow.

One way of handling clock skew has been to perform a crude correction whenever needed. Thus, upon encountering, buffer overflow of the jitter buffer, packets may be discarded. On the other hand, upon encountering buffer underflow of the jitter buffer, certain packets may be replayed to avoid pausing. If the clock skew is not too severe, then such correction may take place once every few minutes which may be perceptually acceptable. However, if the clock skew is severe, then corrections may be needed more frequently, up to once every few seconds. In this case, a crude correction will create perceptually unacceptable artefacts.

U.S. Pat. No. 5,699,481 teaches a timing recovery scheme for packet speech in a communication system comprising a controller, a speech decoder and a common buffer for exchanging coded speech packages (CSP) between the controller and the speech decoder. The coded speech packages are generated by and transmitted from another communication system to the communication system via a communication channel, such as a telephone line. The received coded speech packets are entered into the common buffer by the controller. Whenever the speech decoder detects excessive or missing speech packages in the common buffer, the speech decoder switches to a special corrective mode. If excessive speech data is detected, it is played out faster than usual while if missing data is detected, the available data is played out slower than usual. Faster playout of data is effected by the speech decoder discarding some speech information while slower playout of data is effected by the speech decoder synthesizing some speech-like information. The speech decoder may modify either the synthesized output speech signal, i.e. the signal after complete speech decoding, or, in the preferred embodiment, the intermediate excitation signal, i.e. the intermediate speech signal prior to LPC-filtering. In either case, manipulation of smaller duration units and silence or unvoiced units results in better quality of the modified speech.

The article "Priority discarding of Speech in Integrated Packet Networks", Petr et al, IEEE Journal on Selected Areas in Communication, vol. 7, no. 5, June 1989 discloses an integrated packet network (IPN) in which overload control is accomplished by taking advantage of the inherent structure of the speech signal. A delivery priority is assigned to each speech packet at the transmitter. The delivery priority assigned to a certain speech packet depends on how important the content of the speech packet is to the communication. In response to an overload situation occuring in the network, i.e. when for a short period of time the arrival rate at a packet multiplexer exceeds the service rate causing short-term congestion at the packet multiplexer, speech packets are discarded according to the assigned delivery priority.

U.S. Pat. No. 5,659,541 discloses methods of reducing accumulated gross delay in packet switched voice transmission. According to U.S. Pat. No. 5,659,541, an A/D converter provides voice samples by sampling the analog voice signal at a predetermined rate. The voice samples are assembled into packets and transmitted through a packet switching network to a receiving party where the digitized speech samples are inserted in an arrival buffer. The depth of the arrival buffer is monitored and if the arrival buffer contains more than a threshold number of digital samples, a leaky filter is actuated to discard a predetermined number of the samples in the arrival buffer. The leaky filter may e.g. discard one out of every "X" samples where "X" is either a predetermined fixed number, compute a random number "Y" and discard the "Yth" sample in the arrival buffer or detect a group of low energy samples in the buffer (e.g. samples corresponding to a period of silence) and discard the samples of this group.

SUMMARY

The problem dealt with by the present invention is providing an improved way of controlling buffering delay in a jitter buffer for buffering blocks of compressed speech information in a first node of a communication system.

A an improved way of controlling buffering delay in a jitter buffer for buffering blocks of compressed speech information in a first node of a communication system is provided.

Speech quality is improved by enabling actions aiming at reducing buffering delay in the jitter buffer to be selectively applied to blocks of compressed speech information which are of less importance to perceived voice quality as compared to other blocks of compressed speech information.

The technology advantageously affords an improved way of controlling buffering delay in a jitter buffer for buffering blocks of compressed speech information.

Speech quality may be improved by selectively applying actions aiming at reducing buffering delay in the jitter buffer to blocks of compressed speech information which are of less importance to perceived voice quality as compared to other blocks of compressed speech information.

The invention will now be described in more detail with reference to exemplary embodiments thereof and also with reference to the accompanying drawings.

DETAILED DESCRIPTION OF THE EMBODIMENTS

Figure 1:
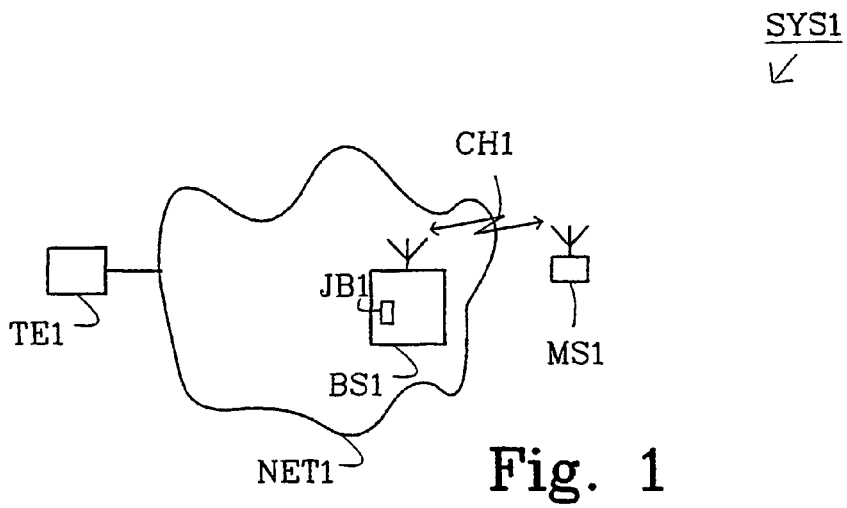
FIG. 1 is a schematic view of a communication system in which the technology is applied.

FIG. 1 illustrates an exemplary communication system SYS1 in which the present technology is applied. The communication system SYS1 comprises a fixed terminal TE1, e.g. a personal computer, a packet switched network NET1, which typically is implemented as an internet or intranet comprising a number of subnetworks, and a mobile station MS1. The packet switched network NET provides packet switched communication of both speech and other user data and includes a base station BS1 capable of communicating with mobile stations, including the mobile station MS1. Communications between the base station BS1 and mobile stations occur on radio channels according to the applicable air interface specifications. In the exemplary communication system SYS1, the air interface specifications provides radio channels for packet switched communication of data over the air interface. However for transport of speech over the air interface, radio channels are provided which are basically circuit switched and identical to or very similar to the radio channels provided in circuit switched GSM systems. The use of such radio channels is actually the current working assumption in the ETSI standardization of Enhanced GPRS (EGPRS) and GSM/EDGE Radio Access Network (GERAN) for how packet switched speech should be transported over the air interface.

Thus, in an exemplary scenario of a voice communication session, i.e. a phone call, involving a user at the fixed terminal TE1 and a user at the mobile station MS1, voice information is communicated between the fixed terminal TE1 and the base station BS1 using a packet switched mode of communication. The well known real-time transport protocol (RTP), User Datagram Protocol (UDP) and Internet Protocol (IP) specified by IETF are used to convey speech packets, including blocks of compressed speech information, between the fixed terminal TE1 and the base station BS1. At the base station BS1, the RTP, UDP and IP protocols are terminated and the blocks of compressed speech information are transported between the base station BS1 and the mobile station MS1 over a circuit switched radio channel CH1 assigned for serving the phone call. The radio channel CH1 being circuit switched implies that the radio channel CH1 is dedicated to transport blocks of speech information associated with the call at a fixed bandwith.

In order to manage variations in transmission delay, which individual packets experience when being transmitted through the packet switched network NET1 from the fixed terminal TE1 to the base station BS1, the base station BS1 includes a jitter buffer JB1 associated with the radio channel CH1.

In the exemplary communication system SYS1 of FIG. 1, the radio channel CH1 is adapted to provide transmission of blocks of compressed speech information at a rate which requires that speech signal sampling is performed at a rate of 8 kHz, i.e. the traditional sample rate used for circuit switched telephony. However, even though a fixed terminal in the communication system SYS1 is supposed to use a sample rate of 8 kHz, it is quite probable that the actual sample rate provided by a soundboard in the fixed terminal TE1 deviates significantly from the required sample rate of 8 kHz. A typical sound board is often provided with a clock primarily adapted to provide a 44.1 kHz sample rate, i.e. corresponding to the sample rate of Compact Discs (CD), and a sample rate of approximately 8 kHz is then derived from the 44.1 kHz sample rate. As an example, a sample rate of 8.018 kHz may be derived from 44.1 kHz according to the expression $$44.1*10/55=8.018 \text{ kHz} \tag{1}$$

Thus the problem of clock skew between a fixed terminal and the base station BS1 may occur frequently, causing a significant risk for a jitter buffer, e.g. jitter buffer JB1, in the base station BS1 to experience an ever increasing buffering delay which eventually causes buffer overflow.

The present invention provides a way of controlling buffering delay and avoiding overflow of a jitter buffer in a node of a communications system.

Figure 2:
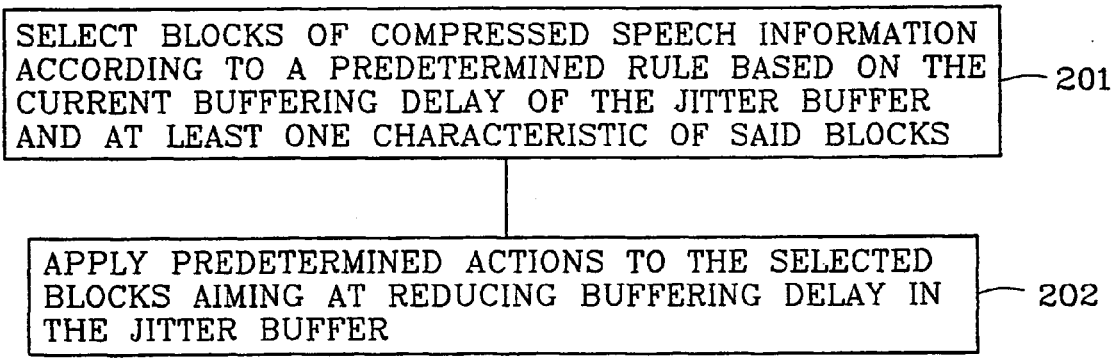
FIG. 2 is a flow diagram illustrating a basic method according to example embodiment.

FIG. 2 illustrates a basic method according to example embodiment for controlling a jitter buffer, e.g. jitter buffer JB1, in a first node in a communication system. The jitter buffer is adapted to buffer a stream of blocks of compressed speech information generated in a second node in the communication system and transmitted to the first node using a packet switched mode of communication At step 201, blocks in said stream of blocks of compressed speech information are selected according to a predetermined rule based on the current buffering delay of the jitter buffer and at least one characteristic of said blocks of compressed speech information.

At step 202, predetermined actions aiming at reducing buffering delay in the jitter buffer are applied to the selected blocks of compressed speech information. The predetermined actions may e.g. include removing selected blocks from the jitter buffer and/or refraining from inserting selected blocks into the jitter buffer.

Figure 3:
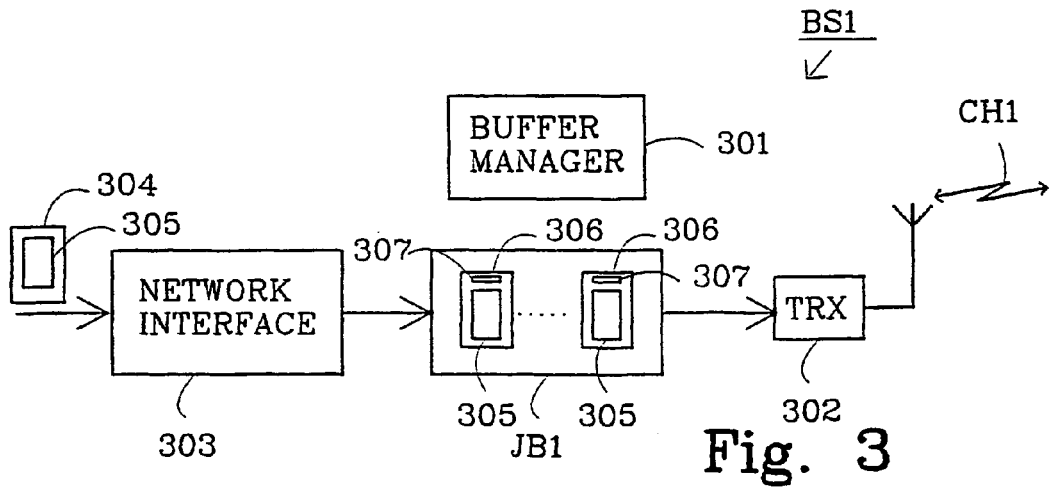
FIG. 3 is a schematic block diagram illustrating the internal structure of a base station according to a first exemplary embodiment of a communication apparatus.

FIG. 3 illustrates more details of the internal structure of the base station BS1 in FIG. 1 according to a first exemplary embodiment of a communication apparatus. FIG. 3 only illustrates elements of the base station BS1 which are deemed relevant to the present technology.

The base station BS1 includes a plurality of jitter buffers including the jitter buffer JB1, a buffer manager 301, a plurality of transceivers including a transceiver 302 and a network interface 303.

The network interface 303 connects the base station BS1 to the packet switched network NET1 and enables the base station BS1 to transmit and receive packets of both user data, including speech packets 304, and signalling data via the packet switched network NET1. In the exemplary communication system SYS1 of FIG. 1, the network interface terminates the RTP, UDP and IP protocols used for communicating speech packets 304 in the packet switched network NET1. Each speech packet 304 includes one block 305 of compressed speech information representing a speech segment of fixed length, e.g. 20 ms.

The transceiver 302 handles transmission and reception of radio signals on the radio channel CH1. At regular intervals, the transceiver is provided with blocks 305 of compressed speech information from the jitter buffer JB1 for transmission over the radio channel CH1 to the mobile station MS1.

The jitter buffer JB1 is provided to delay the individual blocks 305 as needed to compensate for transmission delay variations occurring when transmitting said blocks 305 of compressed speech information from the fixed terminal TE1 to the base station BS1 via the packet switched network NET1. In the exemplary first embodiment, each entry 306 in the jitter buffer JB1 includes one block 305 of compressed speech information together with a timestamp 307 indicating when the entry 306 was inserted into the jitter buffer JB1.

The buffer manager 301 controls operation of the jitter buffer JB1. It is responsible for arranging the blocks 305 of compressed speech information in the jitter buffer JB1 in the correct sequence, providing the transceiver 302 with blocks 305 of compressed speech information for transmission over the radio channel CH1 at regular intervals and also to control the buffering delay of the jitter buffer JB1.

Figure 4:
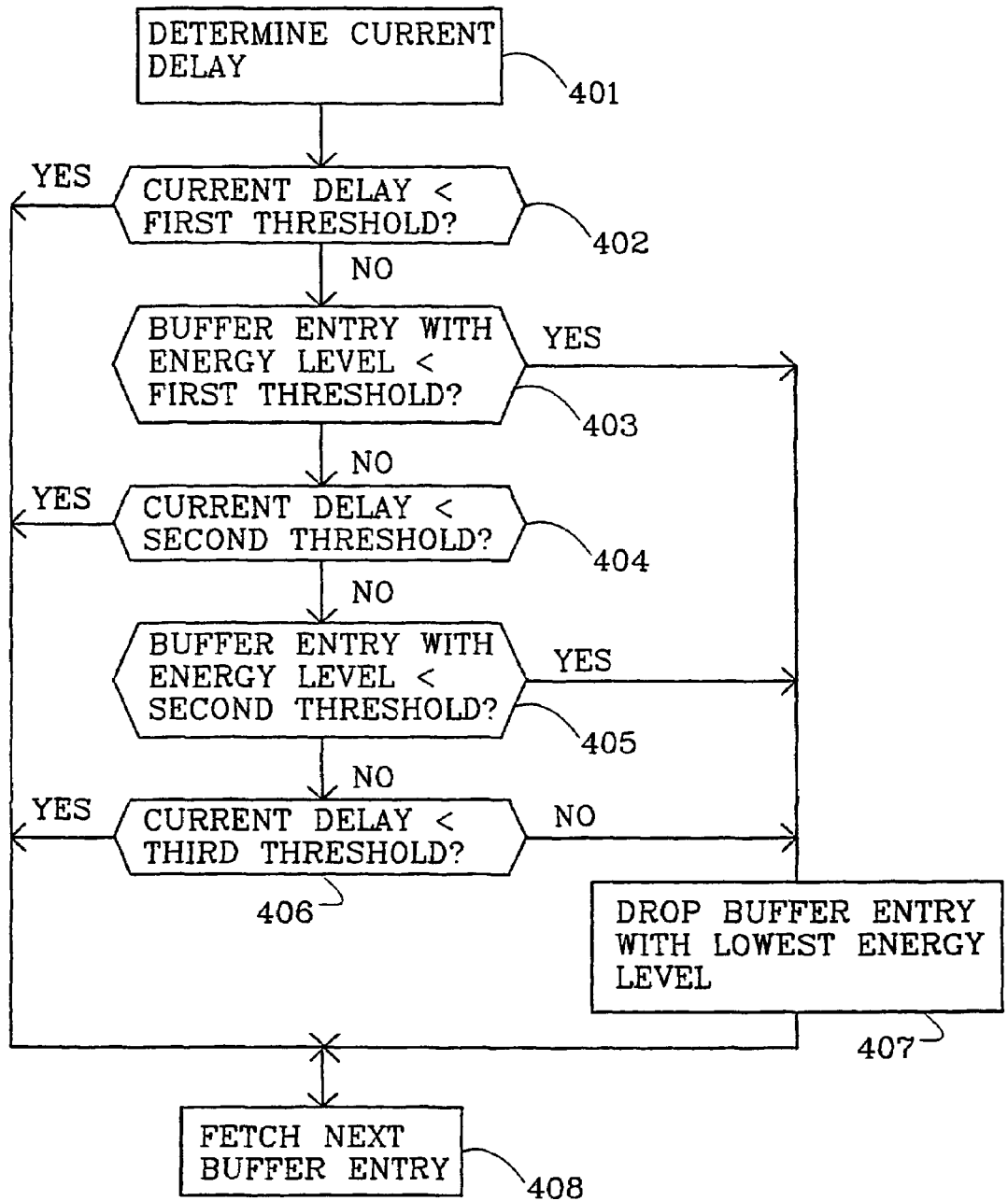
FIG. 4 is a flow diagram illustrating a method of jitter buffer delay control used in the base station of FIG. 3.

FIG. 4 illustrates processing performed by the buffer manager 301 each time the transceiver 302 needs to be provided with a new block 305 of compressed speech information for transmission over the radio channel CH1.

At step 401 the buffer manager 301 determines the current buffering delay in the jitter buffer JB1. The current delay is in this exemplary embodiment calculated by comparing the current time and the time stamp 307 of the oldest jitter buffer entry 306. At step 402 the current delay is compared to a first delay threshold. If the current delay is less than the first delay threshold (an alternative YES at step 402), processing continues at step 408. Otherwise (an alternative NO at step 402), a check is made at step 403 whether there is a jitter buffer entry 306 including a block 305 of compressed speech information representing a speech segment having an energy level below a first energy level threshold. If such a jitter buffer entry 306 is found (an alternative YES at step 403), processsing continues at step 407. Otherwise (an alternative NO at step 403), the current delay is compared to a second delay threshold, which is greater than the first delay threshold, at step 404. If the current delay is less than the second delay threshold (an alternative YES at step 404), processing continues at step 408.

Otherwise (an alternative NO at step 404), a check is made at step 405 whether there is a jitter buffer entry 306 including a block 305 of compressed speech information representing a speech segment having an energy level below a second energy level threshold which is greater than the first energy level threshold. If such a jitter buffer entry 306 is found (an alternative YES at step 405), processsing continues at step 407. Otherwise (an alternative NO at step 405), the current delay is compared to a third delay threshold, which is greater than the second delay threshold, at step 406. If the current delay is less than the third delay threshold (an alternative YES at step 406), processing continues at step 408. Otherwise (an alternative NO at step 406), processing continues at step 407 where, the buffer manager 301 drops, i.e. removes from the jitter buffer JB1 and discards, the block 305 which represents a speech segment having the lowest energy level among the speech segments represented by all the blocks 305 currently stored in the jitter buffer JB1. After step 407 and alternative YES at steps 402, 404 and 406, processing continues at step 408 wherein the buffer manager 301 fetches the next jitter buffer entry 306, i.e. the oldest jitter buffer entry, from the jitter buffer JB1 and delivers the block 305 of compressed speech information included in said jitter buffer entry 306 to the transceiver 302 for transmission over the radio channel CH1.

Thus, as illustrated by FIG. 4, if the current delay of the jitter buffer JB1 exceeds the first delay threshold, the buffer manager 301 selects and drops blocks 305 representing speech segments having energy levels below the first energy level threshold.

If the current delay of the jitter buffer JB1 exceeds the second delay threshold, which is greater than the first delay threshold, the buffer manager 301 selects and drops blocks 305 representing speech segments having energy levels below the second energy level threshold, which is higher than the first energy threshold level.

Each time the current delay of the jitter buffer JB1 exceeds the third delay threshold DTH3, which is greater than the second delay threshold DTH2, the buffer manager 301 selects and drops a block 305 which represents a speech segment having the lowest energy level among the speech segments represented by all the blocks 305 currently stored in the jitter buffer JB1.

The first, second and third delay thresholds as well as the first and second energy threshold levels are selected according to the general principles that if a net speech quality improvement is achieved from dropping a particular block, that block should be dropped. The net speech quality results from the quality improvement due to a reduced buffering delay as a consequence of dropping a block of compressed speech information and the quality degradation due to the information loss that would be caused by dropping the same block of compressed speech information. The exact threshold values may be determined by performing informal listening tests, i.e. evaluating the opinions of a plurality of people on which combinations of delay and energy threshold levels provide the best speech quality. The jitter buffer JB1 is designed for being able to compensate for normal variations in transmission delay of speech packets which can be expected in the packet switched network NET1 and the first delay threshold is thus selected such that normal variations in transmission delay does not cause dropping of blocks of compressed speech information. As an example, assuming the normal variations in transmission delay could be up to 10 ms, the first delay threshold would be set to at least 30 ms to ensure that if a block of compressed speech information is dropped, causing the buffering delay of the jitter buffer JB1 to be reduced by 20 ms, the jitter buffer JB1 is still capable of providing up to at least 10 ms of delay if necessary to compensate for variations in transmission delay.

Apart from the exemplary first embodiment disclosed above, there are numerous ways of providing rearrangements, modifications and substitutions of the first embodiment resulting in additional embodiments.

Thus, as an alternative, or a complement, to monitoring the current delay of the jitter buffer JB1 and trying to perform actions aiming at reducing excessive buffering delay each time the transceiver 302 needs to be provided with a new block of compressed speech information, the buffer manager 301 could perform such processing each time a new block of compressed speech information has been received and is about to be inserted into the jitter buffer JB1. According to one embodiment, the buffer manager 301 could be adapted to first insert the new block into the jitter buffer JB1 and then perform all the processing steps of FIG. 4 except for step 408. In an alternative embodiment, the buffer manager 301 could be adapted to first consider the current delay of the jitter buffer JB1 and whether it would be suitable to discard the new block in order to reduce the buffering delay prior to actually inserting the new block into the jitter buffer JB1. According to this alternative embodiment, the buffering delay of the jitter buffer JB1 could be reduced both by selecting blocks stored in the jitter buffer JB1 and removing the selected blocks from the jitter buffer JB1 as well as by selecting new blocks and refraining from inserting the selected new blocks into the jitter buffer JB1.

There are alternative ways of defining and determining the current delay. One example of such an alternative way would be to estimate when the last block of compressed speech information added to the jitter buffer will be fetched for transmission and defining the current delay based on this estimate and the time when the last block of compressed speech information was added to the jitter buffer. In this alternative embodiment, it is not necessary to include in each jitter buffer entry a time stamp specifying when the respective jitter buffer entry was added to the jitter buffer. Thus, each jitter buffer entry could be reduced to consist of a single block of compressed speech information and instead a single variable associated with the jitter buffer could be used for storing the time when the last jitter buffer entry was added to the jitter buffer. In other embodiments, preferably where each block of compressed speech information represents shorter speech segments of e.g. 5 ms length, it may suffice to use the number of blocks currently stored in the jitter buffer as a measure of the current delay.

As already indicated, in different embodiments of the technology, each jitter buffer entry may comprise one block of compressed speech information or may include additional data associated with said one block of compressed speech information. One example of such additional data is e.g. the time stamp 307 which in the first exemplary embodiment indicates when a jitter buffer entry 306 was inserted into the jitter buffer JB1. In other embodiments, the additional data may include additional data contained in the packet in which a block of compressed speech information was received and may even include the complete packet. Including complete speech packets in the jitter buffer may e.g. be desirable in a modified version of the exemplary communication system of FIG. 1, in which the RTP, UDP and IP protocols are not terminated in the network but in the mobile stations and thus complete packets need to be transported over the air interface to the mobile stations. This would of course require radio channels providing more bandwith than in current circuit switched GSM systems.

In the exemplary first embodiment, the buffer manager 301 selects packets according to a predetermined rule based on the current delay of the jitter buffer JB1 and energy levels of the speech segment represented by blocks 305 currently stored in the jitter buffer JB1. Depending on which speech coding algorithm has been used, and thus the format of the blocks 305 of compressed speech information, the speech segment (frame) energy levels may be directly available in the blocks 305 or implicitly available in which case partial decoding of the packets has to be performed to obtain the speech segment energy levels. An alternative to obtaining the speech segment energy levels through partial decoding of the blocks of compressed speech information, would be for the node, e.g. the fixed terminal TE1, generating the blocks of compressed speech information, to include the corresponding speech segment energy levels in a separate field of each speech packet. Thus each speech packet would include both a block of compressed speech information and an additional field specifying the energy of the speech segment represented by said block. In such an arrangement, it would be preferable to include both the blocks of compressed information as well as the associated speech segment energy levels as entries in the jitter buffer JB1

The packet switched network NET1 in FIG. 1 could be adapted to implement an overload control mechanism based on delivery priorities as suggested in the aforementioned article "Priority discarding of Speech in Integareted Packet Networks" by Petr et al. Thus, the fixed terminal TE1, would be adapted to assign a delivery priority to each speech packet including a block of compressed speech information, wherein the delivery priority would reflect how important each speech packet, i.e. each block of compressed speech information, is to the perceived speech quality. Apart from using the delivery priorities to perform overload control in the packet switched network NET1 as suggested by Petr et al, the delivery priorities of the speech packets in which blocks of compressed speech information are received by the base station BS1 could also be used in yet another embodiment of the invention as a basis for selecting and discarding blocks of compressed information in order to reduce the buffering delay in the jitter buffer JB1. Thus, according to this example embodiment, blocks of compressed speech information would be selected for, e.g., removal from the jitter buffer JB1 based on the current delay of the jitter buffer JB1 and the delivery priorities of the speech packets in which the blocks were received by the base station BS1.

The speech segment energy levels represented by blocks of compressed speech information is but one example of a characteristic of said blocks which could be used in combination with the current delay of the jitter buffer as a basis for selecting blocks of compressed speech information. Another example would be to consider whether the blocks of compressed speech information represent segments of voiced or unvoiced speech. Generally blocks representing voiced speech segments are more important to the perceived speech quality, and thus the predetermined rule for selecting blocks could specify that e.g. primarily blocks representing unvoiced speech segments should be selected. An estimate on whether a block represents a voiced or unvoiced speech segment could e.g. be derived from parameters representing LPC-prediction gain and/or LTP-predicition gain according to methods well known to a person skilled in the art. Yet another example of a suitable block characteristic to consider is the so called AMR-codec mode used to encode blocks of compressed speech information when applying Adaptive Multi-Rate (AMR) coding. AMR-coding provides different coding modes, each using different number of bits for representing a speech segment and thus enabling a trade off between the number of information source bits used to represent a speech segement and the level of error protection which can be provided for said information bits. The lowest AMR-codec mode, i.e. the coding mode using a minimum number of bits to represent a speech segment, is used when radio channel conditions are relatively bad and the distortion caused by dropping a block of compressed speech information coded using the lowest AMR-codec mode will be less audible than if a higher rate codec-mode was used under better radio conditions. Thus when the lowest AMR-codec mode is used, it may become advantageous to drop a block of compressed speech information at a lower delay threshold as compared to if the same speech segment was coded using a higher rate AMR-codec mode.

Another way of reducing the delay of the jitter buffer JB1, apart from discarding selected packets removed from the jitter buffer, would be to select, based on the current delay and at least one characteristic of the blocks of compressed speech information, pairs of consecutive packets and transmit the most important parts of each block in a pair using the same bandwith as one complete block of compressed speech information while discarding the remaining parts of the blocks in said pair. At the mobile station, the missing information could be randomly created. The mobile station would need to be able to distinguish between receipt of ordinary complete blocks of compressed speech information and combinations of the most important parts of two consecutive blocks. Preferably also a channel coding scheme providing fair protection against bit errors for all bits in a combined block would be implemented.

As a person skilled in the art appreciates, the invention is applicable in basically all situations where a jitter buffer is used for buffering blocks of compressed speech information.

The invention claimed is:

1. A method for controlling a jitter buffer in a first node of a communication system, wherein the jitter buffer is adapted to buffer a stream of blocks of compressed speech information generated in a second node in the communication system, transmitted to and received in the first node, the method comprising the steps of:
   selecting blocks in said stream of blocks of compressed speech information according to a predetermined rule based on the current buffering delay of the jitter buffer and at least one characteristic of said blocks of compressed speech information;
   applying predetermined actions to the selected blocks aiming at reducing buffering delay in the jitter buffer;
   wherein said predetermined rule for selecting blocks includes selecting blocks representing speech segments having energy levels below a first energy level threshold if the current delay of the jitter buffer exceeds a first delay threshold value;
   wherein said predetermined rule for selecting blocks includes selecting blocks representing speech segments having energy levels below a second energy level threshold, which is higher than the first energy level threshold, if the current delay of the jitter buffer exceeds a second delay threshold value greater than the first delay threshold value.

2. A method according to claim 1, wherein said predetermined rule for selecting blocks includes selecting blocks representing speech segments having the lowest energy level among the speech segments represented by the blocks currently stored in the first node.

3. A communication apparatus for use as a first node in a communication system, the communication apparatus-comprising:
   a jitter buffer for buffering a stream of blocks of compressed speech information generated in a second node of the communication system, transmitted to and received by the first node;
   a control unit for controlling operation of the jitter buffer, wherein the control unit is adapted to select blocks in said stream of blocks of compressed speech information according to a predetermined rule based on the current buffering delay of the jitter buffer and at least one characteristic of said blocks of compressed speech information and wherein the control unit further is adapted to apply predetermined actions to the selected blocks aiming at reducing buffering delay in the jitter buffer;
   wherein said predetermined rule for selecting blocks includes selecting blocks representing speech segments having energy levels below a first energy level threshold if the current delay of the jitter buffer exceeds a first delay threshold value;
   wherein said predetermined rule for selecting blocks includes selecting blocks representing speech segments having energy levels below a second energy level threshold, which is higher than the first energy level threshold, if the current delay of the jitter buffer exceeds a second delay threshold value greater than the first delay threshold value.

4. A communication apparatus according to claim 3, wherein said predetermined rule for selecting blocks includes selecting blocks representing speech segments having the lowest energy level among the speech segments represented by the blocks currently stored in the communication apparatus.

* * * * *

UNITED STATES PATENT AND TRADEMARK OFFICE
CERTIFICATE OF CORRECTION

PATENT NO.         : 7,450,601 B2
APPLICATION NO. : 10/451338
DATED                   : November 11, 2008
INVENTOR(S)         : Sundqvist et al.

It is certified that error appears in the above-identified patent and that said Letters Patent is hereby corrected as shown below:

On the Title Page, in Item (57), under "ABSTRACT" in Column 2, Line 3, delete "butter" and insert -- buffer --, therefor.

On the Title Page, in Item (57), under "ABSTRACT" in Column 2, Line 12, delete "butter" and insert -- buffer --, therefor.

In Column 1, Line 6, delete "PCT/SEO1/02798" and insert -- PCT/SE01/02798 --, therefor.

In Column 2, Line 65, delete "A" before "an improved".

In Column 3, Line 23, after "to" insert -- an --.

In Column 3, Line 39, delete "NET" and insert -- NET1 --, therefor.

In Column 4, Line 7, delete "bandwith." and insert -- bandwidth. --, therefor.

In Column 4, Line 40, after "according to" insert -- an --.

In Column 4, Line 46, delete "communication" and insert -- communication. --, therefor.

In Column 5, Line 49, delete "processsing" and insert -- processing --, therefor.

In Column 5, Line 61, delete "processsing" and insert -- processing --, therefor.

In Column 7, Line 30, delete "preferrably" and insert -- preferably --, therefor.

In Column 7, Line 52, delete "bandwith" and insert -- bandwidth --, therefor.

In Column 7, Line 57, delete "segment" and insert -- segments --, therefor.

In Column 8, Line 9, delete "JB1" and insert -- JB1. --, therefor.

In Column 8, Line 14, delete "Integareted" and insert -- Integrated --, therefor.

In Column 8, Line 49, delete "LTP-predicition" and insert -- LTP-prediction --, therefor.

UNITED STATES PATENT AND TRADEMARK OFFICE
CERTIFICATE OF CORRECTION

PATENT NO. : 7,450,601 B2
APPLICATION NO. : 10/451338
DATED : November 11, 2008
INVENTOR(S) : Sundqvist et al.

It is certified that error appears in the above-identified patent and that said Letters Patent is hereby corrected as shown below:

In Column 8, Line 57, delete "segement" and insert -- segment --, therefor.

In Column 9, Line 10, delete "bandwith" and insert -- bandwidth --, therefor.

In Column 9, Lines 16-17, delete "Preferrably" and insert -- Preferably --, therefor.

In Column 10, Lines 11-12, in Claim 3, delete "apparatus-comprising:" and insert -- apparatus comprising: --, therefor.

Signed and Sealed this

Twenty-first Day of April, 2009

JOHN DOLL
*Acting Director of the United States Patent and Trademark Office*